US006270950B1

(12) United States Patent
Bourdelais et al.

(10) Patent No.: US 6,270,950 B1
(45) Date of Patent: Aug. 7, 2001

(54) PHOTOGRAPHIC BASE WITH ORIENTED POLYOLEFIN AND POLYESTER SHEETS

(75) Inventors: Robert P. Bourdelais, Pittsford; Alphonse D. Camp, Rochester; Peter T. Aylward, Hilton, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/412,129

(22) Filed: Oct. 5, 1999

(51) Int. Cl.$^7$ .............................. G03C 1/93; G03C 1/795; G03C 1/89; B32B 3/00; B32B 3/26

(52) U.S. Cl. .......................... 430/527; 430/533; 430/536; 430/534; 428/315.9; 428/483

(58) Field of Search .................................... 430/533, 534, 430/536, 527; 428/315.9, 483

(56) References Cited

U.S. PATENT DOCUMENTS

| | | | | |
|---|---|---|---|---|
| 3,944,699 | | 3/1976 | Mathews et al. | 428/220 |
| 4,187,113 | | 2/1980 | Mathews et al. | 430/533 |
| 4,283,486 | | 8/1981 | Aono et al. | 430/538 |
| 4,377,616 | | 3/1983 | Ashcraft et al. | 428/213 |
| 4,579,810 | | 4/1986 | Johnson et al. | 430/536 |
| 4,632,869 | | 12/1986 | Park et al. | 428/315.5 |
| 4,994,312 | * | 2/1991 | Maier et al. | 430/533 |
| 5,244,861 | * | 9/1993 | Campbell et al. | 430/201 |
| 5,275,854 | | 1/1994 | Maier et al. | 428/36.5 |
| 5,466,519 | | 11/1995 | Shirakura et al. | 430/538 |
| 5,514,460 | | 5/1996 | Surman et al. | 428/304.4 |
| 5,866,282 | | 2/1999 | Bourdelais et al. | 430/536 |
| 5,874,205 | * | 2/1999 | Bourdelais et al. | 430/536 |
| 5,888,643 | * | 3/1999 | Aylward et al. | 430/536 |
| 5,888,681 | | 3/1999 | Gula et al. | 430/536 |
| 5,998,119 | * | 12/1999 | Aylward et al. | 430/536 |
| 6,001,547 | * | 12/1999 | Gula | 430/536 |
| 6,080,534 | * | 6/2000 | Aylward et al. | 430/536 |

* cited by examiner

*Primary Examiner*—Richard L. Schilling
(74) *Attorney, Agent, or Firm*—Paul A. Leipold

(57) ABSTRACT

A photographic element comprising a laminated base wherein said base comprises a voided polyester sheet having laminated thereto a biaxially oriented polyolefin sheet on the bottom of said polyester sheet and a biaxially oriented polyolefin sheet laminated to the top of said polyester sheet.

19 Claims, No Drawings

PHOTOGRAPHIC BASE WITH ORIENTED POLYOLEFIN AND POLYESTER SHEETS

FIELD OF THE INVENTION

This invention relates to imaging materials. In a preferred form, it relates to base materials for photographic reflective paper.

BACKGROUND OF THE INVENTION

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult requiring great care and expense to ensure proper laydown and cooling of the polyethylene layers. One defect in prior formation techniques is caused when an air bubble is trapped between the forming roller and the polyethylene which will form the surface for casting of photosensitive materials. This air bubble will form a pit that will cause a defect in the photographic performance of photographic materials formed on the polyethylene. It would be desirable if a more reliable and improved surface could be formed at less expense.

In color papers there is a need for providing color papers with improved resistance to curl. Present color papers will curl during development and storage. Such curl is thought to be caused by the different properties of the layers of the color paper as it is subjected to the developing and drying processes. Humidity changes during storage of color photographs lead to curling. There are particular problems with color papers when they are subjected to extended high humidity storage such as at greater than 50% relative humidity. Extremely low humidity of less than 20% relative humidity also will cause photographic papers to curl. Image curl creates viewing problems as light is not uniformly reflected from the surface of an image causing the image to appear less sharp. It would be desirable if a reflective photographic image had less image curl such that the ambient viewing light was more uniformly reflected.

In photographic papers the polyethylene layer also serves as a carrier layer for titanium dioxide and other whitener materials as well as tint materials. It would be desirable if the colorant materials rather than being dispersed throughout the polyethylene layer could be concentrated nearer the surface of the layer where they would be more effective photographically.

In U.S. Pat. No. 5,866,282 (Bourdelais et al.), a composite photographic material with laminated biaxially oriented polyolefin sheets has been proposed. While this invention does provide a solution to the sensitivity of photographic paper to humidity, it uses standard photographic base paper whose roughness is replicated on the surface of the imaging element. Traditional cellulose paper base utilized in this invention has a particularly objectionable roughness in the spatial frequency range of 0.30 to 6.35 mm. In this spatial frequency range, a surface roughness average greater than 0.50 micrometers can be objectionable to consumers. Visual roughness greater than 0.50 micrometers in usually referred to as orange peel. It would be desirable if a base with a roughness average less than 0.50 micrometers could be utilized with laminated biaxially oriented sheets.

During the manufacturing process for photographic papers, while the laminated photographic support is being emulsion coated and slit, the laminated structure is subjected to various forces in manufacturing that will cause delamination of the polypropylene sheet from the paper. The delamination may be a result of bonding layer failure to either the base paper or the polypropylene sheet. Also, when the photographic paper is being processed and finished at photofinishers, the laminated structure is also subjected to various forces in both the wet and dry state. Furthermore, when the photographic paper is kept for years by the final customer, the laminated structure is subjected to forces created by temperature and humidity changes that could cause delamination of the biaxially oriented polyolefin sheets from the cellulose paper base. Delamination of the biaxially oriented sheet from the paper during manufacturing will result in the product being wasted thus increasing the cost of manufacture. Delamination of the biaxially oriented sheet from the paper at either the photo finishing operation or in the final customer format will result in a loss in the appearance of the image and the reduction of the commercial value of the photograph. It would be desirable if a melt extruded bonding adhesive could prevent delamination of biaxially oriented sheets from the base paper during manufacture of a laminated imaging support and in the final customer format.

Prior art photographic support materials typically utilize melt extruded polyethylene to waterproof the paper during the wet processing of images during image the image development process. The gelatin based light sensitive silver halide emulsion generally adheres well to the polyethylene layer during manufacturing and wet processing of images. It would be desirable if a biaxially oriented sheet contained an integral bonding layer to provide emulsion adhesion during emulsion coating and the wet processing of images during the image development step.

Commercially available photographic paper typically has a single color logo identifying the manufacturer of the photographic paper. This logo is applied to the backside of the photographic paper and is generally printed on the base paper before the polyethylene coating is applied. The present product is practically limited to a single color because the present production machines are limited by cost and space limitations to a single color press for the printing of indicia onto the back of the base paper. It would be desirable if a low cost method of applying multiple colors to the back side of photographic paper were available.

Present photographic papers generally being constructed of polyethylene coated cellulose paper, can be easily damaged, torn or abraded as images are viewed by consumers over the lifetime of an image. It would be desirable if a photographic paper support were more tear resistant, offering the consumer a image that is tougher than current photographic images.

Prior art photographic reflective paper use white pigments, typically $TiO_2$ and blue colorants to provide a white support and improve image sharpness during exposure by preventing the exposure light from reaching the paper fibers where the light is scattered and reflected back to the imaging layers. It has been found that while the $TiO_2$ does improve image sharpness and does provide a white support, $TiO_2$ below the imaging layers corrupts the dye hue angle of photographic dyes, changing the dye hue angle away from the perceptually preferred hue angle of the dyes. It would be desirable if a support material has the image sharpness, opacity and whiteness of prior art color papers without the use of white pigments in the support.

PROBLEM TO BE SOLVED BY THE INVENTION

There remains a need for a more effective base with improved surface, better tear resistance, improved image curl and better maintained dye hue angle.

SUMMARY OF THE INVENTION

It is an object of the invention to provide improved photographic papers.

It is another object to provide a base material for photosensitive images that will have improved surface smoothness.

It is a further object to provide a photographic element with improved dye hue angle.

It is another object to provide tear resistant photographic paper.

It is a further object to provide a photographic reflective paper that may have multiple color indicia on the back of photographic images.

These and other objects of the invention are accomplished by a photographic element comprising a laminated base wherein said base comprises a voided polyester sheet having laminated thereto a biaxially oriented polyolefin sheet on the bottom of said polyester sheet and a biaxially oriented polyolefin sheet laminated to the top of said polyester sheet.

ADVANTAGEOUS EFFECT OF THE INVENTION

The invention provides an improved photographic support. It particularly provides improved photographic papers that are smoother, tear resistant, have greater resistance to curl, and are improved for dye hue angle.

DETAILED DESCRIPTION OF THE INVENTION

The invention has numerous advantages over prior practices in the art. The invention provides a photographic element that has much less tendency to curl when exposed to extremes of humidity. Further, the invention provides a photographic paper that is much lower in cost as the criticalities of the formation of the polyethylene are removed. There is no need for the difficult and expensive casting and cooling in forming a surface on the polyethylene layer as the biaxially oriented polymer sheet of the invention provides a high quality surface for casting of photosensitive layers. The optical properties of the photographic elements in accordance with the invention are improved as the color materials may be concentrated at the surface of the biaxially oriented sheet for most effective use with little waste of the colorant materials. Photographic materials utilizing microvoided sheets and voided polyester base of the invention have improved resistance to tearing. The photographic materials of the invention are lower in cost to produce as the microvoided sheet may be scanned for quality prior to assembly into the photographic member. With present polyethylene layers the quality of the layer cannot be assessed until after complete formation of the base paper with the polyethylene waterproofing layer attached. Therefore, any defects result in expensive discard of expensive product. The invention allows faster hardening of photographic paper emulsion, as water vapor is not transmitted from the emulsion through the biaxially oriented sheets.

The photographic elements of this invention are more scratch resistant as the oriented polymer sheet on the back of the photographic element resists scratching and other damage more readily than polyethylene. The photographic elements of this invention are balanced for stiffness in the machine and cross directions. A balanced stiffness of the photographic element is perceptually preferred over a photographic element that is predominantly stiff in one direction. The photographic elements of this invention utilize a low cost method for printing multiple color branding information of the back side of the image increasing the content of the information on the back side of the image. The voided polyester base used in the invention is smoother than prior art cellulose paper and substantially free of undesirable orange peel which interferes with the viewing of the image.

The photographic elements of this invention utilize an integral emulsion bonding layer that allows the emulsion to adhere to the support materials during manufacturing and wet processing of images. The microvoided sheets of the invention are laminated to the polyester base utilizing a bonding layer that prevents delamination of the biaxially oriented sheets from the base paper. These and other advantages will be apparent from the detailed description below.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image. The term as used herein, "transparent" means the ability to pass radiation without significant deviation or absorption. For this invention, "transparent" material is defined as a material that has a spectral transmission greater than 90%. For a photographic element, spectral transmission is the ratio of the transmitted power to the incident power and is expressed as a percentage as follows; $T_{RGB}=10^{-D}*100$ where D is the average of the red, green and blue Status A transmission density response measured by an X-Rite model 310 (or comparable) photographic transmission densitometer.

The layers of the top biaxially oriented polyolefin sheet of this invention have levels of voiding, optical brightener and colorants adjusted to provide optimum optical properties for image sharpness, lightness and opacity. An important aspect of this invention is the voided polymer layer(s) under the silver halide image layer. The microvoided polymer layers in the oriented polyolefin sheet and the voided polyester base provides acceptable opacity, sharpness and lightness without the use of expensive white pigments that is typical with prior art materials. Because the use of white pigments is avoided, the dye hue of color dye couplers coated on the support of this invention is significantly improved yielding an image with snappy color. The preferred percent transmission for the reflective support material of this invention is between 0 and 5%. For a reflective support material, transmission of a significant amount of light is undesirable as light illuminates the logo printing on the back of the image, reducing the quality of the image during viewing. A percent transmission greater than 7% allows enough light to be transmitted during image viewing to reduce the quality of the image.

The biaxially oriented polyolefin sheet is laminated to a voided polyester base for stiffness and for efficient image processing as well as consumer product handling. Lamination of high strength biaxially oriented polyolefin sheets to the voided polyester base significantly increases the tear resistance of the photographic element compared to present photographic paper. Because the white pigments have been significantly reduced in the top biaxially oriented sheet, the voided polyester is required to maintain image opacity to reduce image show through. The biaxially oriented sheets are laminated to the voided polyester base with an ethylene metallocene plastomer that allows for lamination speeds exceeding 500 meters/min and optimizes the bond between the voided polyester base and the biaxially oriented polyolefin sheets.

The biaxially oriented sheets used in the invention contain an integral emulsion bonding layer which avoids the need for expensive priming coatings or energy treatments. The bonding layer used in the invention is a low density polyethylene skin on the biaxially oriented sheet. Gelatin based silver halide emulsion layers of the invention have been shown to adhere well to low density polyethylene when used in combination with corona discharge treatment. The integral bonding skin layer also serves as a carrier for the blue tints that correct for the native yellowness of the gelatin based silver halide image element. Concentrating the blue tints in the thin, skin layer reduces the amount of expensive blue tint materials when compared to prior art photographic papers that contain blue tint materials.

The back side of the photographic element is laminated with a biaxially oriented sheet to reduce humidity image curl. There are particular problems with prior art color papers when they are subjected to extended high humidity storage such as at greater than 50% relative humidity. The high strength biaxially oriented sheet on the back side resists the curling forces, producing a much flatter image. The biaxially oriented sheet on the back has roughness at two frequencies to allow for efficient conveyance through photographic processing equipment and improved consumer writability as consumers add personal information to the back side of photographic paper with pens and pencils. The biaxially oriented sheet also has an energy to break of $4.0\times10^7$ joules per cubic meter to allow for efficient chopping and punching of the photographic element during photographic processing of images.

Any suitable biaxially oriented polyolefin sheet may be used for the sheet on the top side of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

Composite Sheet Density×100=% of Solid Density Polymer Density

Percent solid density should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 100 micrometers, preferably from 20 to 70 micrometers. Below 20 micrometers, the microvoided sheets may not be thick enough to minimize any inherent non-planarity in the support and would be more difficult to manufacture. At thickness higher than 70 micrometers, little improvement in either surface smoothness or mechanical properties are seen, and so there is little justification for the further increase in cost for extra materials.

The preferred material is a biaxially oriented polyolefin sheet that is coated with high barrier polyvinylidene chloride in a range of coverage 1.5 to 6.2 $g/m^2$. Polyvinyl alcohol can also be used but is less effective under high relative humidity conditions. Through the use of at least one of these materials in combination with a biaxially oriented sheet and a polymer tie layer, it has been shown that improved rates of emulsion hardening can be achieved. In said photographic or imaging element, the water vapor barrier can be achieved by integrally forming said vapor barrier by coextrusion of the polymer(s) into at least one or more layers and then orienting the sheet by stretching it in the machine direction and then the cross direction. The process of stretching creates a sheet that is more crystalline and has better packing or alignment of the crystalline areas. Higher levels of crystallinity results in lower water vapor transmissions rates which in turn results in faster emulsion hardening. The oriented sheet is then laminated to a paper base.

"Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula $Ar—C(R)═CH_2$, wherein Ar represents an aromatic hydrocarbon radical, or an aromatic halohydrocarbon radical of the benzene series and R is hydrogen or the methyl radical; acrylate-type monomers include monomers of the formula $CH_2═C(R')—C(O)(OR)$ wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2═CH(O)COR$, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

The total thickness of the top most skin layer should be between 0.20 micrometers and 1.5 micrometers, preferably between 0.5 and 1.0 micrometers. Below 0.5 micrometers any inherent non-planarity in the extruded skin layer may result in unacceptable color variation. At skin thickness greater than 1.0 micrometers, there is a reduction in the photographic optical properties such as image resolution. At thickness greater that 1.0 micrometers there is also a greater material volume to filter for contamination such as clumps or poor color pigment dispersion.

Addenda may be added to the top most skin layer to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been pre blended at the desired blend ratio. Colored pigments that can resist extrusion temperatures greater than 320° C. are preferred as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments and Irgalite organic blue pigments. Optical brightener may also be added to the skin layer to absorb UV energy and emit light largely in the blue region. $TiO_2$ may also be added to the skin layer. While the addition of $TiO_2$ in the thin skin layer of this invention does not significantly contribute to the optical performance of the sheet it can cause numerous manufacturing problems such as extrusion die lines and spots and corrupt the hue angle of the photographic dyes. The skin layer substantially free of $TiO_2$ is preferred. $TiO_2$ added to a layer between 0.20 and 1.5 micrometers does not substantially improve the optical properties of the support, will add cost to the design and will cause objectionable pigments lines in the extrusion process.

A photographic element substantially free of white pigments is preferred. It has been found that when photographic dyes are coated on support containing white pigments, the hue angle of the developed image changes compared to the hue angle of the dyes coated onto a transparent support. The hue angle change of photographic dyes caused by the presence of white pigments often reduces the quality level of the dyes compared to the dye set coated on a transparent base that substantially free of white pigments. The preferred change in dye hue angle of the developed image compared to the hue angle of the dyes coated onto a transparent support is less than 7 degrees. Dye hue angle changes greater than 9 degrees are not significantly different from typical color photographic reflective papers.

The layer adjacent and below the voided layer may also contain white pigments of this invention. A layer that is substantially colorant free is preferred as there is little improvement in the optical performance of the photographic support when colorants are added below the voided layer.

Addenda may be added to the biaxially oriented sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are view outside as sunlight contains ultraviolet energy and may be used to optimize image quality for consumer and commercial applications.

Addenda known in the art to emit visible light in the blue spectrum are preferred. Consumers generally prefer a slight blue tint to white defined as a negative b* compared to a white white defined as a b* within one b* unit of zero. b* is the measure of yellow/blue in CIE space. A positive b* indicates yellow while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit can not be noticed by most customers therefore is it not cost effective to add optical brightener to the biaxially oriented sheet. An emission greater that 5 b* units would interfere with the color balance of the prints making the whites appear too blue for most consumers.

The preferred addenda of this invention is an optical brightener. An optical brightener is colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis(O-Cyanostyryl) Benzol and 2-Amino-4-Methyl Phenol.

The sheet contains a stabilizing amount of hindered amine at or about 0.01 to 5% by weight in at least one layer of said sheet. While these levels provide improved stability to the biaxially oriented sheet, the preferred amount at or about 0.1 to 3% by weight provides an excellent balance between improved stability for both light and dark keeping while making the structure more cost effective.

The hindered amine light stabilizer (HALS) may come from the common group of hindered amine compounds originating from 2,2,6,6-tetramethylpiperidine, and the term hindered amine light stabilizer is accepted to be used for hindered piperidine analogues. The compounds form stable nitroxyl radicals that interfere with photo-oxidation of polypropylene in the presence of oxygen, thereby affording excellent long-term photostability of the imaging element. The hindered amine will have sufficient molar mass to minimize migration in the final product, will be miscible with polypropylene at the preferred concentrations, and will not impart color to the final product. In the preferred embodiment, examples of HALS include poly{[6-[(1,1,3,3-tetramethylbutylamino}-1,3,5-triazine-4-piperidinyl)-imino]-1,6-hexanediyl[(2,2,6,6-tetramethyl-4-piperdinyl) imino]} (Chimassorb 944 LD/FL), Chimassorb 119, and bis(1,2,2,6,6-pentamethyl-4-piperidinyl)[3,5-bis(1,1-dimethylethyl-4-hydroxyphenyl)methyl]butylpropanedioate (Tinuvin 144), although they are not limited to these compounds.

In addition, the sheet may contain any of the hindered phenol primary antioxidants commonly used for thermal stabilization of polypropylene, alone or in combination with a secondary antioxidants. Examples of hindered phenol primary antioxidants include pentaerythrityl tetrakis [3-(3,5-di-tert-butyl-4-hydroxyphenyl)proprionate] (such as Irganox 1010), octadecyl 3-(3,5-di-tert-butyl-4-hydroxyphenyl) proprionate (such as Irganox 1076), benzenepropanoic acid 3,5-bis(1,1-dimethyl)4-hydroxy-2[3-[3,5-bis(1,1-dimethylethyl)-4-hydroxyphenyl)-1-oxopropyl)hydrazide (such as Irganox MD1024), 2,2'-thiodiethylenebis[3-(3,5-di-tert-butyl-4-hydroxyphenyl)proprionate] (such as Irganox 1035),1,3,5-trimethyl-2,4,6-tri(3,5-di-tert-butyl-4-hydroxybenzyl)benzene (such as Irganox 1330), but are not limited to these examples. Secondary antioxidants include organic alkyl and aryl phosphites including examples such as triphenylphosphite (such as Irgastab TPP), tri(n-propylphenyl-phophite) (such as Irgastab SN-55), 2,4-bis(1,1-dimethylphenyl) phosphite (such as Irgafos 168), and in a preferred embodiment would include Irgafos 168. The combination of hindered amines with other primary and secondary antioxidants have a synergistic benefit in a multilayer biaxially oriented polymer sheet by providing thermal stability to polymers such as polypropylene during melt processing and extrusion and further enhancing their light and dark keeping properties which is not evident in a mono layer system for imaging products such as photographs. These unexpected results provide for a broader range of polymers that can be utilized in imaging product thus enabling enhanced features to be incorporated into their design.

The optical brightener may be added to any layer in the multilayer coextruded biaxially oriented polyolefin sheet. The preferred location is adjacent to or in the exposed surface layer of said sheet. This allows for the efficient concentration of optical brightener which results in less optical brightener being used when compared to traditional photographic supports. Typically 20% to 40% less optical brightener is required when the optical brightener is concentrated in a functional layer close to the imaging layers.

When the desired weight % loading of the optical brightener begins to approach a concentration at which the optical brightener migrates to the surface of the support forming crystals in the imaging layer, the addition of optical brightener into the layer adjacent to the exposed layer is preferred. In prior art imaging supports that use optical brightener, an expensive grades of optical brightener are used to prevent migration into the imaging layer. When optical brightener migration is a concern, as with light sensitive silver halide imaging systems, the preferred exposed layer comprises polyethylene that is substantially free of optical brightener. In this case, the migration from the layer adjacent to the exposed layer is significantly reduced because the exposed surface layer acts as a barrier for optical brightener migration allowing for much higher optical brightener levels to be used to optimize image quality. Further, locating the optical brightener in the layer adjacent to the exposed layer allows for a less expensive optical brightener to be used as the exposed layer, which is substantially free of optical brightener, prevents significant migration of the optical brightener. Another preferred method to reduce unwanted optical brightener migration in biaxially oriented sheets of this invention is to use polypropylene for the layer adjacent to the exposed surface. Prior art photographic supports generally use melt extruded polyethylene to provide waterproofing to the base paper. Since optical brightener is more soluble in polypropylene than polyethylene, the optical brightener is less likely to migrate from polypropylene to the exposed surface layer.

A biaxially oriented sheet of this invention which has a microvoided core is preferred. The microvoided core adds opacity and whiteness to the imaging support further improving imaging quality. Combining the image quality advantages of a microvoided core with a material which absorbs ultraviolet energy and emits light in the visible spectrum allows for the unique optimization of image quality as the image support can have a tint when exposed to ultraviolet energy yet retain excellent whiteness when the image is viewed using lighting that does not contain significant amounts of ultraviolet energy such as indoor lighting.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a preferred top four layer biaxially oriented sheet of the invention where the exposed surface layer is adjacent to the imaging layer is as follows:

Polyethylene exposed surface layer with blue tint

Polypropylene layer containing optical brightener

Polypropylene microvoided layer with 0.55 grams per cubic cm density

Polypropylene layer

The sheet on the side of the voided polyester base sheet opposite to the emulsion layers or backside sheet may be any suitable sheet having the surface roughness used in this invention. The sheet may or may not be microvoided. Biaxially oriented sheets are conveniently manufactured by coextrusion of the sheet, which may contain several layers, followed by biaxial orientation. Such biaxially oriented sheets are disclosed in, for example, U.S. Pat. No. 4,764, 425.

The preferred backside polymer sheet is a biaxially oriented polyolefin sheet, most preferably a sheet of polyethylene or polypropylene. The thickness of the biaxially oriented sheet should be from 10 to 150 micrometers. Below 15 micrometers, the sheets may not be thick enough to minimize any inherent non-planarity in the support and would be more difficult to manufacture. At thickness higher than 70 micrometers, little improvement in either surface smoothness or mechanical properties are seen, and so there is little justification for the further increase in cost for extra materials.

Suitable classes of thermoplastic polymers for the backside biaxially oriented sheet core and skin layers include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins for the core and skin layers of the backside sheet include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. No. 2,465,319 and U.S. Pat. No. 2,901,466. Preferred continuousmatix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the back side of the laminated base can be made with one or more layers of the same polymeric material, or it can be made with layers of different polymeric composition. For compatibility, an auxiliary layer can be used to promote adhesion of multiple layers.

The coextrusion, quenching, orienting, and heat setting of these biaxially oriented sheets may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously streached in both directions. After the sheet has been stretched, it is heat set by heating to a temperature sufficient to crystallize the polymers while restraining to some degree the sheet against retraction in both directions of stretching.

The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching. A typical biaxial orientation ratio for the machine direction to cross direction is 5:8. A 5:8 orientation ratio develops that mechanical properties of the biaxially oriented sheet in both the machine and cross directions. By altering the orientation ratio, the mechanical properties of the biaxially oriented sheet can be developed in just one direction or both directions. An orientation ratio that yields the desired mechanical properties of this invention is 2:8.

In the photographic processing process it is necessary that the photographic processing machines chop rolls of photographic paper into the final image format. Generally, the photographic processing equipment is only required to make chops in the cross machine direction as the manufacturer of the imaging element has previously cut to a width that is suitable for the photographic processing machine being utilized. It is necessary that these chops in the cross direction be accurate and cleanly made. Inaccurate cuts lead to fiber projections hanging from the prints which is undesirable. The undesirable fiber projections are primarily tom backside polymer sheet and not cellulose paper fiber. Further, poor cross machine direction cutting can lead to damaging of the edges of the final image. With imaging elements containing biaxially oriented sheets in the base, the standard photographic processing machine cutters have difficulty in producing edges free of fibrous projections. Therefore, there is a need which is solved by this invention to provide a biaxially oriented sheet containing photograic element that may be cut in the cross direction by conventional cutters.

In the photographic processing process it is necessary that the photographic processing machines punch index holes into the imaging element as it moves through the machine. An accurate or incomplete punching of these holes will lead to undesirable results as the machine will not image the prints in the proper place. Further, failure to properly make index punches may lead to jamming as prints may be cut to a size which the machine cannot handle. Since punching in photographic processing equipment usually occurs from the emulsion side, the fracture mechanism of bottom of the photographic element is a combination of cracks originating from both the punch and die. With tight clearances, as in a punch and die set with less than 1,000,000 actuation, the cracks, originating from the tool edges, miss each other and the cut is completed by a secondary tearing process producing a jagged edge approximately midway in bottom sheet thickness that is a function of punch and die clearance. As the punch and die begin to wear from repeated actuations, excessive clearance is formed allowing for extensive plastic deformation of the bottom sheet. When the crack finally forms, it can miss the opposing crack, separation is delayed and a long polymer burr can form in the punched hole. This long burr can cause unacceptable punched holes which can result in machine jams. For punching of the bottom biaxially oriented sheet of this invention the energy to break is a significant factor in determining the quality of the punched index hole. Lowering the energy to break the bottom sheet for punching allows for punching fracture to occur at lower punch forces and aids in the reduction of punch burrs in the punched hole. The energy to break for the bottom polymer sheets of this invention is defined as the area under the stress strain curve. Energy to break is measured by running a simple tensile strength test for polymer sheets at a rate of 4000% strain per min.

For imaging materials that are chopped or for imaging materials that are punched with an index hole, energy to break of less than $3.5\times10^7$ J/m$^3$ for the bottom biaxially oriented sheet in at least one direction is preferred. A biaxially oriented polymer sheet with a energy to break greater than $4.0\times10^7$ J/m$^3$ does not show significant improvement in chopping or punching. For photographic paper that is chopped in photographic processing equipment an energy to break of less than $3.5\times10^7$ J/m$^3$ in machine direction is preferred since the chopping usually occurs in the cross direction.

For imaging elements of this invention, the most preferred energy to break is between $9.0\times10^5$ J/m$^3$ and $3.5\times10^7$ J/m$^3$. Bottom polymer sheets with an energy to break less than $5.0\times10^5$ J/m$^3$ are expensive in that the process yield for oriented bottom sheets are reduced as lower orientation ratios are used to lower the energy to break. An energy to break greater than $4.0\times10^7$ J/m$^3$ does not show significant improvement for punching and chopping over cast low density polyethylene sheets that are commonly used as backside sheets in prior art imaging supports.

The preferred thickness of the biaxially oriented sheet should be from 12 to 50 micrometers. Below 12 micrometers, the sheets may not be thick enough to minimize any inherent non-planarity in the support, would be more difficult to manufacture and would not provide enough strength to provide curl resistance to a gel containing imaging layer such as a light sensitive silver halide emulsion. At thickness higher than 50 micrometers, little improvement in mechanical properties are seen, and so there is little justification for the further increase in cost for extra materials. Also at thickness greater than 50 micrometers, the force to punch an index hole in the photographic processing equipment is beyond the design force of some photographic processing equipment. Failure to complete a punch will result in machine jamming and loss of photographic processing efficiency.

The bottom biaxially oriented polyolefin sheet preferably is provided with indicia. Prior art photographic reflective paper typically contains indicia on the side opposite the image layers, identifying the manufacturer of the photographic paper. The indicia for the prior art photographic paper is printed on the cellulose paper base prior to polyolefin extrusion coating. The bottom biaxially oriented polyolefin sheet preferably is reverse printed such that when the bottom biaxially oriented polyolefin sheet is laminated to the voided polyester base with the printed side laminated to the voided polyester, the indicia is protected from photographic processing chemistry and consumer handling. The indicia may be one or more colors and may be applied by any method known in the art for printing on biaxially oriented sheets. Examples include gravure printing, off set lithography printing, screen printing and ink jet printing.

The surface roughness of the backside sheet of this invention has two necessary surface roughness components to provide both efficient transport in photographic processing equipment and writability and photographic processing back marking. A combination of both low frequency roughness to provide efficient transport and high frequency roughness to provide a surface for printing and writing is preferred. High frequency surface roughness defined as having a spatial frequency greater than 500 cycles/mm with a median peak to valley height less than 1 micrometer. High frequency roughness is determining factor in photographic processing back marking where valuable information is printed on the backside of an image and consumer backside writability where a variety of writing instruments such as pens and pencils are used to mark the backside of an image. High frequency roughness is measured using a Park Scientific M-5 Atomic Force multi mode scanning probe microscope. Data collection was accomplished by frequency modulation intermittent contact scanning microscopy in topography mode. The tip was an ultra level 4:1 aspect ratio with an approximate radius of 100 Angstroms.

Low frequency surface roughness of backside biaxially oriented sheet or Ra is a measure of relatively finely spaced surface irregularities such as those produced on the back side of prior art photographic materials by the casting of polyethylene against a rough chilled roll. The low frequency surface roughness measurement is a measure of the maximum allowable roughness height expressed in units of micrometers and by use of the symbol Ra. For the irregular profile of the backside of photographic materials of this invention, the average peak to valley height, which is the average of the vertical distances between the elevation of the highest peak and that of the lowest valley, is used. Low frequency surface roughness, that is surface roughness that has spatial frequency between 200 and 500 cycles/mm with a median peak to valley height greater than 1 micrometer. Low frequency roughness is the determining factor in how efficiently the imaging element is transported through photographic processing equipment, digital printers and manufacturing processes. Low frequency roughness is commonly measured by surface measurement device such as a Perthometer.

Biaxially oriented polyolefin sheets commonly used in the packaging industry are commonly melt extruded and then orientated in both directions (machine direction and cross direction) to give the sheet desired mechanical strength properties. The process of biaxially orientation generally creates a low frequency surface roughness of less than 0.23 micrometers. While the smooth surface has value in the packaging industry, use as a back side layer for photographic paper is limited. The preferred low frequency roughness for biaxially oriented sheets of this invention is between 0.30 and 2.00 micrometers. Laminated to the back side of the base paper, the biaxially oriented sheet must have a low frequency surface roughness greater than 0.30 micrometers to ensure efficient transport through the many types of photographic processing equipment that have been purchased and installed around the world. At a low frequency surface roughness less that 0.30 micrometers, transport through the photographic processing equipment becomes less efficient. At low frequency surface roughness greater than 2.54 micrometers, the surface would become too rough causing transport problems in photographic processing equipment and the rough backside surface would begin to emboss the silver halide emulsion as the material is wound in rolls.

The structure of a preferred backside biaxially oriented sheet of this invention wherein the skin layer is on the bottom of the photographic element is as follows:

Solid polypropylene core

Copolymer of polyethylene and a terpolymer of ethylene, propylene and butylene (skin layer)

Styrene butadiene methacrylate coating

The low frequency surface roughness of the skin layer can be accomplished by introducing addenda into the bottommost layer. The particle size of the addenda is preferably between 0.20 micrometers and 10 micrometers. At particles sizes less than 0.20 micrometers, the desired low frequency surface roughness can not be obtained. At particles sizes greater than 10 micrometers, the addenda begins to create unwanted surface voids during the biaxially orientation process that would be unacceptable in a photographic paper application and would begin to emboss the silver halide emulsion as the material is wound in rolls. The preferred addenda to be added to the bottom most skin layer, to create the desired back side roughness, comprises a material selected from the group of inorganic particulates consisting of titanium dioxide, silica, calcium carbonate, barium sulfate, alumina, kaolin, and mixtures thereof. The preferred addenda may also be crosslinked polymers beads using monomers from the group consisting of styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, polystyrene or poly(methyl methacrylate).

Addenda may also be added to the biaxially oriented back side sheet to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet.

The most preferred method of creating the desired low frequency roughness on the bottom most skin layer of a biaxially oriented sheet is the use of incompatible block copolymers mixed with a matrix polymer such as polypropylene. Block copolymers of this invention are polymers containing long stretches of two or more monomeric units linked together by chemical valences in one single chain. During the biaxially orientation of the sheet, the incompatible block copolymers do not mix with each other or the matrix polymer and as a result a bumpy, rough surface is created. During orientation of the biaxially oriented sheet of this invention, when the skin layer is oriented above the glass transition temperature of the matrix polymer the incompatible block copolymers flow at different rates and create desired low frequency surface roughness and a lower surface gloss when compared to a typical biaxially oriented sheet containing homopolymers in the skin layer (which flow at the same rate and thus create a uniform smooth surface). The preferred block copolymers of this invention are mixtures of polyethylene and polypropylene. An example of a polymer formulation that provides the low frequency surface roughness of this invention is a copolymer of polyethylene and a terpolymer comprising ethylene, propylene and butylene.

The final preferred method for increasing the low frequency surface roughness of smooth biaxially oriented sheets is embossing roughness into the sheet by use of a commercially available embossing equipment. Smooth sheets are transported through a nip that contains a nip roll and a impression roll. The impression roll under pressure and heat embosses the roll pattern onto the biaxially oriented smooth sheets. The surface roughness and pattern obtained during embossing is the result of the surface roughness and pattern on the embossing roll.

A random low frequency roughness pattern is preferred on the bottom most layer of the biaxially oriented sheet. A random pattern, or one that has no particular pattern is preferred to an ordered pattern because the random pattern best simulates the appearance and texture of cellulose paper which adds to the commercial value of a photographic image. A random pattern on the bottom most skin layer will reduce the impact of the low frequency surface roughness transferring to the image side when compared to an ordered pattern. A transferred low frequency surface roughness pattern that is random is more difficult to detect than a ordered pattern.

The preferred high frequency roughness of biaxially oriented sheets of this invention is between 0.001 to 0.05 $\mu$m when measured with a high pass cutoff filter of 500 cycles/mm. High frequency roughness less than 0.0009 micrometers does not provide the required roughness for photographic processing back mark retention though wet chemistry processing of images. The high frequency roughness provides a non uniform surface upon which the ink from the back mark, usually applied by a contact printer or ink jet printer, can adhere and be protected from the abrasion of photographic processing. High frequency roughness greater than 0.060 micrometers does not provide the proper roughness for improved consumer writability with pens and pencils. Pens, much like the photographic processing back mark need a site for the pen ink to collect and dry. Pencils need a roughness to abrade the carbon from the pencil.

High frequency surface roughness of the backside sheet of this invention is accomplished by coating a separate layer on the skin which contains material that will produce the desired frequency of surface roughness, or by some combination of the two methods. Materials that will provide the desired high frequency of roughness include silicon dioxide, aluminum oxide, calcium carbonate, mica, kaolin, alumina, barium sulfate, titanium dioxide, and mixtures thereof. In addition, crosslinked polymer beads using styrene, butyl acrylamide, acrylonitrile, methy methacrylate, ethylene glycol dimethacrylate, vinyl pryidine, vinyl acetate, methy acrylate, vinyl benzyl chloride, vinyledene chloride, acrylic acid, divinyl benzene, acrylamido methyl-propane, and polysiloxane resin may be used to form high frequency surface roughness of this invention. All these stated materials may be used in the skin layer, or as a coated layer, or in some combination thereof.

The preferred method by which the desired high frequency roughness may be created is through the application of a coated binder. The coated binder may be coated using a variety of methods known in the art to produce a thin, uniform coating. Examples of acceptable coating methods include gravure coating, air knife coating, application roll coating, or curtain coating. The coated binder may coated with or without a cross linker, that consists of a styrene acrylate, styrene butadiene methacrylate, styrene sulfonates, or hydroxy ethyl cellulose, or some mixture there of These binders may be used alone to acheive the desired high frequency roughness, or combined with any of the particulates described above to achieve said roughness. The preferred class of binder materials consists of an addition product of from about 30 to 78 mol % of an alkyl methacrylate wherein the alkyl group has from 3 to 8 carbon atoms, from about 2 to about 10 mol % of an alkali metal salt of an ethylenically unsaturated sulfonic acid and from 20 to about 65 mol % of a vinyl benzene, the polymer having a glass transition point of from 30 to 65° C. When properly formulated, coated, and dried, the coalescence of the latex produces a high frequency roughness in combination with or without colloidal silica that is particularly useful for backmarking and photographic processing back printing retention.

An example of a preferred material to provide the high frequency roughness of this invention is styrene butadiene methacrylate coated on to a biaxially oriented skin layer consisting of a copolymer of polyethylene and a terpolymer comprising ethylene, propylene and butylene. The styrene butadiene methacrylate is coated at 25 grams/$m^2$ using gravure/backing coating roll system. The styrene butadiene methacrylate coating is dried to a surface temperature of 55° C. The biaxially oriented sheet of this example contains a low frequency component from the biaxially copolymer formulation and a high frequency component from the coated layer of styrene butadiene methacrylate.

In order to successfully transport a photographic print material that contains a laminated biaxially oriented sheet with the desired surface roughness, on the opposite side of the image layer, an antistatic coating on the bottom most layer is preferred. The antistatic coating may contain any known materials known in the art which are coated on photographic web materials to reduce static during the transport of photographic paper. The preferred surface resistivity of the antistic coat at 50% RH is less than $10^{13}$ ohm/square.

These biaxially oriented sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

The polyester base sheet utilized as the support material of the invention should have a glass transition temperature between about 50 C and about 150° C., preferably about 60–100° C., should be orientable, and have an intrinsic viscosity of at least 0.50, preferably 0.6 to 0.9. Suitable polyesters include those produced from aromatic, aliphatic or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexane-dicarboxylic, sodiosulfoiso-phthalic and mixtures thereof. Examples of suitable glycols include ethylene glycol, propylene glycol, butanediol, pentanediol, hexanediol, 1,4-cyclohexane-dimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol and 1,4-cyclohexanedimethanol. Poly (ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

Suitable cross-linked polymers for the microbeads used in void formation during sheet formation are polymerizable organic materials which are members selected from the group consisting of an alkenyl aromatic compound having the general formula

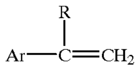

wherein Ar represents an aromatic hydrocarbon radical, or an aromatic halohydrocarbon radical of the benzene series and R is hydrogen or the methyl radical; acrylate-type monomers including monomers of the formula

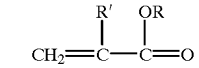

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula

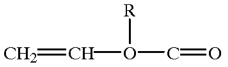

wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$, wherein n is a whole number within the range of 2–10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, oiallyl fumarate, diallyl phthalate and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening to produce beads spanning the range of the original distribution of sizes. Other processes such as suspension polymerization, limited coalescence, directly yield very uniformly sized particles. Suitable slip agents or lubricants include colloidal silica, colloidal alumina, and metal oxides such as tin oxide and aluminum oxide. The preferred slip agents are colloidal silica and alumina, most preferably, silica. The cross-linked polymer having a coating of slip agent may be prepared by procedures well known in the art. For example, conventional suspension polymerization processes wherein the slip agent is added to the suspension is preferred. As the slip agent, colloidal silica is preferred.

It is preferred to use the "limited coalescance" technique for producing the coated, cross-linked polymer microbeads. This process is described in detail in U.S. Pat. No. 3,615,972. Preparation of the coated microbeads for use in the present invention does not utilize a blowing agent as described in this patent, however.

The following general procedure may be utilized in a limited coalescence technique:

1. The polymerizable liquid is dispersed within an aqueous nonsolvent liquid medium to form a dispersion of droplets having sizes not larger than the size desired for the polymer globules, whereupon
2. The dispersion is allowed to rest and to reside with only mild or no agitation for a time during which a limited coalescence of the dispersed droplets takes place with the formation of a lesser number of larger droplets, such coalescence being limited due to the composition of the suspending medium, the size of the dispersed droplets thereby becoming remarkably uniform and of a desired magnitude, and
3. The uniform droplet dispersion is then stabilized by addition of thickening agents to the aqueous suspending medium, whereby the uniform-sized dispersed droplets are further protected against coalescence and are also retarded from concentrating in the dispersion due to difference in density of the disperse phase and continuous phase, and
4. The polymerizable liquid or oil phase in such stabilized dispersion is subjected to polymerization conditions and polymerized, whereby globules of polymer are obtained having spheroidal shape and remarkably uniform and desired size, which size is predetermined principally by the composition of the initial aqueous liquid suspending medium.

The diameter of the droplets of polymerizable liquid and, hence, the diameter of the beads of polymer, can be varied predictably by deliberate variation of the composition of the aqueous liquid dispersion, within the range of from about one-half of a micrometer or less to about 0.5 centimeter. For any specific operation, the range of diameters of the droplets of liquid and, hence, of polymer beads, has a factor in the order of three or less as contrasted to factors of 10 or more for diameters of droplets and beads prepared by usual suspension polymerization methods employing critical agitation procedures. Since the bead size, e.g., diameter, in the present method is determined principally by the composition of the aqueous dispersion, the mechanical conditions, such as the degree of agitation, the size and design of the apparatus used, and the scale of operation, are not highly critical. Furthermore, by employing the same composition, the operations can be repeated, or the scale of operations can be changed, and substantially the same results can be obtained.

The present method is carried out by dispersing one part by volume of a polymerizable liquid into at least 0.5, preferably from 0.5 to about 10 or more, parts by volume of a nonsolvent aqueous medium comprising water and at least the first of the following ingredients:

1. A water-dispersible, water-insoluble solid colloid, the particles of which, in aqueous dispersion, have dimensions in the order of from about 0.008 to about 50 micrometers, which particles tend to gather at the liquid-liquid interface or are caused to do so by the presence of
2. A water-soluble "promotor" that affects the "hydrophilic-hydrophobic balance" of the solid colloid particles; and/or
3. An electrolyte; and/or
4. Colloid-active modifiers such as peptizing agents, surface-active agents and the like; and, usually,
5. A water-soluble, monomer-insoluble inhibitor of polymerization.

The water-dispersible, water-insoluble solid colloids can be inorganic materials such as metal salts or hydroxides or clays, or can be organic materials such as raw starches, sulfonated cross-linked organic high polymers, resinous polymers and the like.

The solid colloidal material must be insoluble but dispersible in water and both insoluble and non-dispersible in, but wettable by, the polymerizable liquid. The solid colloids must be much more hydrophilic than oleophilic so as toTemain dispersed wholly within the aqueous liquid. The solid colloids employed for limited coalescence are ones having particles that, in the aqueous liquid, retain a relatively rigid and discrete shape and size within the limits stated. The particles may be greatly swollen and extensively hydrated, provided that the swollen particle retains a definite shape, in which case the effective size is approximately that of the swollen particle. The particles can be essentially single molecules, as in the case of extremely high molecular weight cross-linked resins, or can be aggregates of many molecules. Materials that disperse in water to form true or colloidal solutions in which the particles have a size below the range stated or in which the particles are so diffuse as to lack a discernible shape and dimension are not suitable as stabilizers for limited coalescence. The amount of solid colloid that is employed is usually such as corresponds to from about 0.01 to about 10 or more grams per 100 cubic centimeters of the polymerizable liquid.

In order to function as a stabilizer for the limited coalescence of the polymerizable liquid droplets, it is essential that the solid colloid must tend to collect with the aqueous liquid at the liquid-liquid interface, i.e., on the surface of the oil droplets. (The term "oil" is occasionally used herein as generic to liquids that are insoluble in water.) In many instances, it is desirable to add a "promoter" material to the aqueous composition to drive the particles of the solid colloid to the liquid-liquid interface. This phenomenon is well known in the emulsion art, and is here applied to solid colloidal particles, as a expanded of adjusting the "hydrophilic-hydrophobic balance."

Usually, the promoters are organic materials that have an affinity for the solid colloid and also for the oil droplets and that are capable of making the solid colloid more oleophilic. The affinity for the oil surface is usually due to some organic portion of the promoter molecule while affinity for the solid colloid is usually due to opposite electrical charges. For example, positively charged complex metal salts or hydroxides, such as aluminum hydroxide, can be promoted by the presence of negatively charged organic promoters such as water-soluble sulfonated polystyrenes, alignates and carboxymethylcellulose. Negatively charged colloids, such as Bentonite, are promoted by positively charged promoters such as tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, and polyethylenimine. Amphoteric materials such as proteinaceous materials like gelatin, glue, casein, albumin, glutin and the like, are effective promoters for a wide variety of colloidal solids. Nonionic materials like methoxycellulose are also effective in some instances. Usually, the promoter need be used only to the extent of a few parts per million of aqueous medium although larger proportions can often be tolerated. In some instances, ionic materials normally classed as emulsifiers, such as soaps, long chain sulfates and sulfonates and the long chain quaternary ammonium compounds, can also be used as promoters for the solid colloids, but care must be taken to avoid causing the formation of stable colloidal emulsions of the polymerizable liquid and the aqueous liquid medium.

An effect similar to that of organic promoters is often obtained with small amounts of electrolytes, e.g., water-soluble, ionizable alkalies, acids and salts, particularly those having polyvalent ions. These are especially useful when the excessive hydrophilic or insufficient oleophilic characteristic of the colloid is attributable to excessive hydration of the colloid structure. For example, a suitably cross-linked sulfonated polymer of styrene is tremendously swollen and hydrated in water. Although the molecular structure contains benzene rings which should confer on the colloid some affinity for the oil phase in the dispersion, the great degree of hydration causes the colloidal particles to be enveloped in a cloud of associated water. The addition of a soluble, ionizable polyvalent cationic compound, such as an aluminum or calcium salt, to the aqueous composition causes extensive shrinking of the swollen colloid with exudation of a part of the associated water and exposure of the organic portion of the colloid particle, thereby making the colloid more oleophilic.

The solid colloidal particles whose hydrophilic-hydrophobic balance is such that the particles tend to gather in the aqueous phase at the oil-water interface, gather on the surface of the oil droplets and function as protective agents during limited coalescence.

Other agents that can be employed in an already known manner to effect modification of the colloidal properties of the aqueous composition are those materials known in the art as peptizing agents, flocculating and deflocculating agents, sensitizers, surface active agents and the like.

It is sometimes desirable to add to the aqueous liquid a few parts per million of a water-soluble, oil-insoluble inhibitor of polymerization effective to prevent the polymerization of monomer molecules that might diffuse into the aqueous liquid or that might be absorbed by colloid micelles and that, if allowed to polymerize in the aqueous phase, would tend to make emulsion-type polymer dispersions instead of, or in addition to, the desired bead or pearl polymers.

The aqueous medium containing the water-dispersible solid colloid is then admixed with the liquid polymerizable material in such a way as to disperse the liquid polymerizable material as small droplets within the aqueous medium. This dispersion can be accomplished by any usual means, e.g., by mechanical stirrers or shakers, by pumping through jets, by impingement, or by other procedures causing subdivision of the polymerizable material into droplets in a continuous aqueous medium.

The degree of dispersion, e.g., by agitation is not critical except that the size of the dispersed liquid droplets must be no larger, and is preferably much smaller, than the stable droplet size expected and desired in the stable dispersion. When such condition has been attained, the resulting dispersion is allowed to rest with only mild, gentle movement, if any, and preferably without agitation. Under such quiescent conditions, the dispersed liquid phase undergoes a limited degree of coalescence.

"Limited coalescence" is a phenomenon wherein droplets of liquid dispersed in certain aqueous suspending media coalesce, with formation of a lesser number of larger droplets, until, the growing droplets reach a certain critical and limiting size, whereupon coalescence substantially ceases. The resulting droplets of dispersed liquid, which can be as large as 0.3 and sometimes 0.5 centimeter in diameter, are quite stable as regards further coalescence and are remarkably uniform in size. If such a large droplet dispersion be vigorously agitated, the droplets are fragmented into smaller droplets. The fragmented droplets, upon quiescent standing, again coalesce to the same limited degree and form the same uniform-sized, large droplet, stable dispersion. Thus, a dispersion resulting from the limited coalescence comprises droplets of substantially uniform diameter that are stable in respect to further coalescence.

The principles underlying this phenomenon have now been adapted to cause the occurrence of limited coalescence in a deliberate and predictable manner in the preparation of dispersions of polymerizable liquids in the form of droplets of uniform and desired size.

In the phenomenon of limited coalescence, the small particles of solid colloid tend to collect with the aqueous liquid at the liquid-liquid interface, i.e., on the surface of the oil droplets. It is thought that droplets which are substantially covered by such solid colloid are stable to coalescence while droplets which are not so covered are not stable. In a given dispersion of a polymerizable liquid the total surface area of the droplets is a function of the total volume of the liquid and the diameter of the droplets. Similarly, the total surface area barely coverable by the solid colloid, e.g., in a layer one particle thick, is a function of the amount of the colloid and the dimensions of the particles thereof. In the dispersion as initially prepared, e.g., by agitation, the total surface area of the polymerizable liquid droplets is greater than can be covered by the solid colloid. Under quiescent conditions, the unstable droplets begin to coalesce. The coalescence results in a decrease in the number of oil droplets and a decrease in the total surface area thereof up to a point at which the amount of colloidal solid is barely sufficient substantially to cover the total surface of the oil droplets, whereupon coalescence substantially ceases.

If the solid colloidal particles do not have nearly identical dimensions, the average effective dimension can be estimated by statistical methods. For example, the average effective diameter of spherical particles can be computed as the square root of the average of the squares of the actual diameters of the particles in a representative sample.

It is usually beneficial to treat the uniform droplet suspension prepared as described above to render the suspension stable against congregation of the oil droplets.

This further stabilization is accomplished by gently admixing with the uniform droplet dispersion an agent capable of greatly increasing the viscosity of the aqueous liquid. For this purpose, there may be used any water-soluble or water-dispersible thickening agent that is insoluble in the oil droplets and that does not remove the layer of solid colloidal particles covering the surface of the oil droplets at the oil-water interface. Examples of suitable thickening agents are sulfonated polystyrene (water-dispersible, thickening grade), hydrophilic clays such as Bentonite, digested starch, natural gums, carboxy-substituted cellulose ethers and the like. Often the thickening agent is selected and employed in such quantities as to form a thixotropic gel in which are suspended the uniform-sized droplets of the oil. In other words, the thickened liquid generally should be non-Newtonian in its fluid behavior, i.e., of such a nature as to prevent rapid movement of the dispersed droplets within the aqueous liquid by the action of gravitational force due to the difference in density of the phases. The stress exerted on the surrounding medium by a suspended droplet is not sufficient to cause rapid movement of the droplet within such non-Newtonian media. Usually, the thickener agents are employed in such proportions relative to the aqueous liquid that the apparent viscosity of the thickened aqueous liquid is in the order of at least 500 centipoises (usually determined by means of a Brookfield viscosimeter using the No. 2 spindle at 30 rpm.). The thickening agent is preferably prepared as a separate concentrated aqueous composition that is then carefully blended with the oil droplet dispersion.

The resulting thickened dispersion is capable of being handled, e.g., passed through pipes, and can be subjected to polymerization conditions substantially without mechanical change in the size or shape of the dispersed oil droplets.

The resulting dispersions are particularly well suited for use in continuous polymerization procedures that can be carried out in coils, tubes and elongated vessels adapted for continuously introducing the thickened dispersions into one end and for continuously withdrawing the mass of polymer beads from the other end. The polymerization step is also practiced in batch manner.

The order of the addition of the constituents to the polymerization usually is not critical, but beneficially it is more convenient to add to a vessel the water, dispersing agent, and incorporated the oil-soluble catalyst to the monomer mixture, and subsequently add with agitation the monomer phase to the water phase.

The following is an example illustrating a procedure for preparing the cross-linked polymeric microbeads coated with slip agent. In this example, the polymer is polystyrene cross-linked with divinylbenzene. The microbeads have a coating of silica. The microbeads are prepared by a procedure in which monomer droplets containing an initiator are sized and heated to give solid polymer spheres of the same size as the monomer droplets. A water phase is prepared by combining 7 liters of distilled water, 1.5 g potassium dichromate (polymerization inhibitor for the aqueous phase), 250 g polymethylaminoethanol adipate (promoter), and 350 g LUDOX (a colloidal suspension containing 50% silica sold by DuPont). A monomer phase is prepared by combining 3317 g styrene, 1421 g divinylbenzene (55% active crosslinking agent; other 45% is ethyl vinyl benzene which forms part of the styrene polymer chain) and 45 g VAZO 52 (a monomer-soluble initiator sold by DuPont). The mixture is passed through a homogenizer to obtain 5 micrometer droplets. The suspension is heated overnight at 52° C. to give 4.3 kg of generally spherical microbeads having an average diameter of about 5 micrometers with narrow size distribution (about 2–10 micrometers size distribution). The mol proportion of styrene and ethyl vinyl benzene to divinylbenzene is about 6.1%. The concentration of divinylbenzene can be adjusted up or down to result in about 2.5–50% (preferably 10–40%) crosslinking by the active cross-linker. Of course, monomers other than styrene and divinylbenzene can be used in similar suspension polymerization processes known in the art. Also, other initiators and promoters may be used as known in the art. Also, slip agents other than silica may also be used. For example, a number of LUDOX colloidal silicas are available from DuPont. LEPANDIN colloidal alumina is available from Degussa. NALCOAG colloidal silicas are available from Nalco and tin oxide and titanium oxide are also available from Nalco.

Normally, for the polymer to have suitable physical properties such as resiliency, the polymer is crosslinked. In the case of styrene crosslinked with divinylbenzene, the polymer is 2.5–50% cross-linked, preferably 20–40% cross-linked. By percent cross-linked, it is meant the mol % of crosslinking agent based on the amount of primary monomer. Such limited crosslinking produces microbeads which are sufficiently coherent to remain intact during orientation of the continuous polymer. Beads of such crosslinking are also resilient, so that when they are deformed (flattened) during orientation by pressure from the matrix polymer on opposite sides of the microbeads, they subsequently resume their normal spherical shape to produce the largest possible voids around the microbeads to thereby produce articles with less density.

The microbeads are referred to herein as having a coating of a “slip agent”. By this term it is meant that the friction at the surface of the microbeads is greatly reduced. Actually, it is believed this is caused by the silica acting as miniature ball bearings at the surface. Slip agent may be formed on the surface of the microbeads during their formation by including it in the suspension polymerization mix.

Microbead size is regulated by the ratio of silica to monomer. For example, the following ratios produce the indicated size microbead:

| Microbead Size, Micrometers | Monomer, Parts by Wt. | Slip Agent (Silica) Parts by Wt. |
|---|---|---|
| 2 | 10.4 | 1 |
| 5 | 27.0 | 1 |
| 20 | 42.4 | 1 |

The microbeads of cross-linked polymer range in size from 0.1–50 micrometers, and are present in an amount of 5–50% by weight based on the weight of the polyester. Microbeads of polystyrene should have a Tg of at least 20° C. higher than the Tg of the continuous matrix polymer and are hard compared to the continuous matrix polymer.

Elasticity and resiliency of the microbeads generally results in increased voiding, and it is preferred to have the Tg of the microbeads as high above that of the matrix polymer as possible to avoid deformation during orientation. It is not believed that there is a practical advantage to cross-linking above the point of resiliency and elasticity of the microbeads.

The microbeads of cross-linked polymer are at least partially bordered by voids. The void space in the supports should occupy 2–60%, preferably 30–50%, by volume of the base. Depending on the manner in which the supports are made, the voids may completely encircle the microbeads, e.g., a void may be in the shape of a doughnut (or flattened doughnut) encircling a micro-bead, or the voids may only partially border the microbeads, e.g., a pair of voids may border a microbead on opposite sides.

During stretching the voids of the polyester base sheet assume characteristic shapes from the balanced biaxial orientation of paperlike sheets to the uniaxial orientation of microvoided/satin like fibers. Balanced microvoids are largely circular in the plane of orientation while fiber microvoids are elongated in the direction of the fiber axis. The size of the microvoids and the ultimate physical properties depend upon the degree and balance of the orientation, temperature and rate of stretching, crystallization kinetics, the size distribution of the microbeads, and the like.

The polyester sheets of the invention are prepared by:

(a) forming a mixture of molten continuous matrixpolymer and cross-linked polymer wherein the cross-linked polymer is a multiplicity of microbeads uniformly dispersed throughout the matrix polymer, the matrix polymer being as described herein before, the cross-linked polymer microbeads being as described herein before, (b) forming a polyester base sheet from the mixture by extrusion or casting, (c) orienting the article by stretching to form microbeads of cross-linked polymer uniformly distributed throughout the article and voids at least partially bordering the microbeads on sides thereof in the direction, or directions of orientation.

The mixture may be formed by forming a melt of the matrix polymer and mixing therein the cross-linked polymer. The cross-linked polymer may be in the form of solid or semi-solid microbeads. Due to the incompatibility between the matrix polymer and cross-linked polymer, there is no attraction or adhesion between them, and they become uniformly dispersed in the matrix polymer upon mixing.

When the microbeads have become uniformly dispersed in the matrix polymer, a base is formed by processes such as extrusion or casting. Examples of extrusion or casting would be extruding or casting a sheet. Such forming methods are well known in the art. If sheets are cast or extruded, it is important that such article be oriented by stretching, at least in one direction. Methods of unilaterally or bilaterally orienting sheet are well known in the art. Basically, such methods comprise stretching the sheet at least in the machine or longitudinal direction after it is cast or extruded an amount of about 1.5–10 times its original dimension. Such sheet may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process. Two examples are high-speed melt spinning of fibers and melt blowing of fibers and films to form non-woven/spun-bonded products. In summary, the scope of this invention includes the complete range of forming operations just described.

In general, void formation occurs independent of, and does not require, crystalline orientation of the matrix polymer. Opaque, microvoided sheets have been made in accordance with the methods of this invention using completely amorphous, non-crystallizing copolyesters as the matrix phase. Crystallizable/orientable (strain hardening) matrix materials are preferred for some properties like tensile strength and gas transmission barrier. On the other hand, amorphous matrix materials have special utility in other areas like tear resistance and heat sealability. The specific matrix composition can be tailored to meet many product needs. The complete range from crystalline to amorphous matrix polymer is part of the invention.

When using a voided polyester base, it is preferable to extrusion laminate the top and bottom biaxially oriented polymer sheets to the voided polyester base paper using a polyolefin resin. Extrusion laminating is carried out by bringing together the biaxially oriented sheets of the invention and the voided polyester base with application of an adhesive between them followed by their being pressed in a nip such as between two rollers. The adhesive may be applied to either the biaxially oriented sheets or the voided polyester base prior to their being brought into the nip. In a preferred form the adhesive is applied into the nip simultaneously with the biaxially oriented sheets and the voided polyester base.

The bonding agent used for bonding biaxially oriented sheets to voided polyester base is preferably selected from a group of resins that can be melt extruded at about 160° C. to 300° C. Usually, a polyolefin resin such as polyethylene or polypropylene is used.

Adhesive resins are preferred for bonding biaxially oriented sheets to voided polyester base. An adhesive resin used in this invention is one that can be melt extruded and provide sufficient bond strength between the voided polyester base and the biaxially oriented sheet. For use in the conventional photographic system, peel forces between the paper and the biaxially oriented sheets need to be greater than 150 grams/5 cm to prevent delamination during the manufacture of the photographic base, during processing of an image or in the final image format. "Peel strength" or "separation force" or "peel force" is the measure of the amount of force required to separate the biaxially oriented sheets from the voided polyester base. Peel strength is measured using an Instron gauge and the 180 degree peel test with a cross head speed of 1.0 meters/min. The sample width is 5 cm and the distance peeled is 10 cm.

In the case of a silver halide photographic system, suitable adhesive resins must also not interact with the light sensitive emulsion layer. Preferred examples of adhesive resins are ionomer (e.g. an ethylene metharylic acid copolymer cross linked by metal ions such as Na ions or Zn ions), ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, or ethylene methacrylic acid copolymer. These adhesive resins are preferred because they can be easily melt extruded and provide peel forces between biaxially oriented polyolefin sheets and base paper greater than 150 grams/5 cm.

Metallocene catalyzed polyolefin plastomers are most preferred for bonding oriented polyolefin sheets to voided polyester base because they offer a combination of excellent adhesion to smooth biaxially oriented polyolefin sheets, are easily melt extruded using conventional extrusion equipment and are low in cost when compared to other adhesive resins. Metallocenes are class of highly active olefin catalysts that are used in the preparation of polyolefin plastomers. These catalysts, particularly those based on group IVB transition metals such as zirconium, titanium, and hafnium, show extremely high activity in ethylene polymerization. Various forms of the catalyst system of the metallocene type may be used for polymerization to prepare the polymers used for bonding biaxially oriented polyolefin sheets to cellulose paper. Forms of the catalyst system include but are not limited to those of homogeneous, supported catalyst type, high pressure process or a slurry or a solution polymerization process. The metallocene catalysts are also highly flexible in that, by manipulation of catalyst composition and reaction conditions, they can be made to provide polyolefins with controllable molecular weights. Suitable polyolefins include polypropylene, polyethylene, polymethylpentene, polystyrene, polybutylene and mixtures thereof. Development of these metallocene catalysts for the polymerization of ethylene is found in U.S. Pat. No. 4,937,299 (Ewen et al).

The most preferred metallcoene catalyzed copolymers are very low density polyethylene (VLDPE) copolymers of ethylene and a $C_4$ to $C_{10}$ alpha monolefin, most preferably copolymers and terpolymers of ethylene and butene-1 and hexene-1. The melt index of the metallocene catalyzed ethylene plastomers preferable fall in a range of 2.5 g/10 min to 27 g/10 min. The density of the metallocene catalyzed ethylene plastomers preferably falls in a range of 0.8800 to 0.9100. Metallocene catalyzed ethylene plastomers with a density greater than 0.9200 do not provide sufficient adhesion to biaxially oriented polyolefin sheets.

Melt extruding metallocene catalyzed ethylene plastomers presents some processing problems. Processing results from earlier testing in food packaging applications indicated that their coating performance, as measured by the neck-in to draw-down performance balance, was worse than conventional low density polyethylene making the use of metallocene catalyzed plastomers difficult in a single layer melt extrusion process that is typical for the production of current photographic support. By blending low density polyethylene with the metallocene catalyzed ethylene plastomer, acceptable melt extrusion coating performance was obtained making the use of metallocene catalyzed plastomers blended with low density polyethylene (LDPE) very efficient. The preferred level of low density polyethylene to be added is dependent on the properties of the LDPE used (properties such as melt index, density and type of long chain branching) and the properties of the metallocene catalyzed ethylene plastomer selected. Since metallocene catalyzed ethylene plastomers are more expensive than LDPE a cost to benefit trade-off is necessary to balance material cost with processing advantages such as neck-in and product advantages such as biaxially oriented sheet adhesion to voided polyester base. In general, the preferred range of LDPE blended is 10% to 80% by weight.

The preferred stiffness of the photographic element in any direction is between 150 and 300 millinewtons. The bending stiffness of the polyester base and the laminated display material support is measured by using the Lorentzen and Wettre stiffness tester, Model 16D. The output from is instrument is force, in millinewtons, required to bend the cantilevered, unclasped end of a sample 20 mm long and 38.1 mm wide at an angle of 15 degrees from the unloaded position. A photographic element with stiffness in any direction less than 120 millinewtons can cause transport problems in present photographic processing equipment. Further, photographic element stiffness less than 120 millinewtons is perceived by consumers as low in quality. A photographic element with a stiffness in any direction greater than 330 millinewtons can also cause transport, punching and chopping problems in photographic processing equipment as the stiffness of the photographic element exceeds the capability of present photographic processing equipment.

While melt extrusion polymers are preferred for laminating biaxially oriented polymer sheets to voided polyester, room temperature adhesive lamination can also be useful. Room temperature adhesive lamination is accomplished by applying an adhesive to either the biaxially oriented polymer sheet or the voided polyester base prior to the lamination nip. Suitable adhesives include acrylic pressure sensitive adhesives, UV cure polymer adhesives, and latex based adhesives.

The structure of a preferred photographic base with oriented polyolefin and a voided polyester base where the light sensitive silver halide emulsion is coated on the polyethylene layer is as follows. The polymer layers above and below the adhesive layers were formed as an integral sheet prior to lamination:

Polyethylene exposed surface layer with blue tint

Polypropylene layer containing optical brightener

Polypropylene microvoided layer with 0.55 grams per cubic cm density

Polypropylene layer

Low density polyethylene bonding layer with 0.91 g/cc density

Voided polyester with 0.91 g/cc density

Low density polyethylene bonding layer with 0.91 g/cc density and 12% $TiO_2$

Solid polypropylene core

Copolymer of polyethylene and terpolymer of ethylene, propylene and butylene

Styrene butadiene methacrylate antistatic coating

As used herein, the phrase "photographic element" or "imaging element" is a material that utilizes photosensitive silver halide in the formation of images. The photographic elements can be single color elements, multicolor elements or black and white where there is retained silver after processing of the image. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of ime. The precipitation and spectral and chemical sensitization methods utilized in preparing the emulsions employed in the invention can be those methods known in the art.

Chemical sensitization of the emulsion typically employs sensitizers such as sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating, and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process*, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in *Research Disclosure*, September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black-and-white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 $\mu$m.

The elements of the invention may use materials as disclosed in *Research Disclosure* 40145, September 1997, particularly the couplers as disclosed in Section II of the Research Disclosure.

In the following Table, reference will be made to (1) *Research Disclosure*, December 1978, Item 17643, (2) *Research Disclosure*, December 1989, Item 308119, and (3) *Research Disclosure*, September 1994, Item 36544, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, | morphology and preparation. |
| | XII, XIV, XV | Emulsion preparation |
| | I, II, III, IX | including hardeners, coating |
| 3 | A & B | aids, addenda, etc. |
| 1 | III, IV | Chemical sensitization and |
| 2 | III, IV | spectral sensitization/ |
| 3 | IV, V | desensitization |
| 1 | V | UV dyes, optical brighteners, |
| 2 | V | luminescent dyes |
| 3 | VI | |
| 1 | VI | |
| 2 | VI | Antifoggants and stabilizers |
| 3 | VII | |
| 1 | VIII | Absorbing and scattering |
| 2 | VIII, XIII, XVI | materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; |
| | | Direct positive emulsions |
| 2 | XVIII | Exposure |
| 3 | XVI | |
| 1 | XIX, XX | Chemical processing; |
| 2 | XIX, XX, XXII | Developing agents |
| 3 | XVIII, XIX, XX | |
| 3 | XIV | Scanning and digital |
| | | processing procedures |

The photographic elements can be exposed with various forms of energy which encompass the ultraviolet, visible, and infrared regions of the electromagnetic spectrum, as well as with electron beam, beta radiation, gamma radiation, X ray, alpha particle, neutron radiation, and other forms of corpuscular and wave-like radiant energy in either noncoherent (random phase) forms or coherent (in phase) forms, as produced by lasers. When the photographic elements are intended to be exposed by X rays, they can include features found in conventional radiographic elements.

The imaging elements of this invention can be exposed by means of a collimated beam, to form a latent image, and then processed to form a visible image, preferably by other than heat treatment. A collimated beam is preferred as it allows for digital printing and simultaneous exposure of the imaging layer on the top without significant internal light scatter. A preferred example of a collimated beam is a laser also known as light amplification by stimulated emission of radiation. The laser is preferred because this technology is used widely in a number of digital printing equipment types. Further, the laser provides sufficient energy to simultaneously expose the light sensitive silver halide coating on the top of the display material of this invention without undesirable light scatter. Subsequent processing of the latent image into a visible image is preferably carried out in the known RA-4™ (Eastman Kodak Company) Process or other processing systems suitable for developing high chloride emulsions.

The following examples illustrate the practice of this invention. They are not intended to be exhaustive of all possible variations of the invention. Parts and percentages are by weight unless otherwise indicated.

EXAMPLES

Example 1

In this example, a reflective photographic image material with maintained hue angle was made by laminating a biaxially oriented polyolefin sheet to a photographic grade voided polyester sheet. The laminated reflective imaging support was then coated with a typical consumer color silver halide emulsion. The biaxially oriented polymer top sheet of this example had levels of voiding selected to provide sharpness, whiteness, and opacity without the use of $TiO_2$. The invention was compared to a prior art color photographic reflective paper utilizing melt extruded polyethylene layer with $TiO_2$ and a cellulose paper base. In order to measure the dye hue angle change, the silver halide emulsion was also coated on a transparent polyester base without any white pigments. This example will show that the yellow, magenta, and cyan dye hue angles were maintained within +/−5 degrees from the dyes coated on the transparent support, whereas the prior art photographic reflective paper with $TiO_2$ had dye hue angles that were +/−10 degrees from the dyes coated on the transparent support. Further, this example will demonstrate that desirable photographic properties, such as image gloss and durability, were also improved compared to prior art photographic color paper.

The following laminated photographic support material was made by extrusion laminating the following biaxially oriented polyolefin sheet to top side of a photographic grade voided polyester base:

Top Sheet (Emulsion Side):

A composite sheet consisting of 5 layers identified as L1, L2, L3, L4, and L5. L1 is the thin-colored layer on the top of the biaxially oriented sheet to which the photosensitive silver halide layer was attached. L2 is the layer to which optical brightener was added. The optical brightener used was Hostalux KS manufactured by Ciba-Geigy.

Photographic Grade Voided Polyester Base:

A layer of mircovoided polyester (polyethylene terephthalate) comprising polyester and microbeads with a layer thickness of 100 μm and a percent voiding of 50%. The voiding agent was a cross-linked microbead of polystyrene with divinylbenzene in the amount of 50% by weight of said layer. The mean particle size of the microbead was between 1 to 2 μm and was coated with a slip agent of colloidal alumina. Hostalux KS (Ciba-Geigy) optical brightener was added to the voided polyester base prior to extrusion. The weight of the Hostalux KS optical brightener was 0.12% by weight of polymer.

Bottom Sheet (Backside):

The bottom biaxially oriented sheet laminated to the backside of the voided polyester base was a one-side matte finish, one-side treated biaxially oriented polypropylene sheet (25.6 micrometers thick) (d=0.90 g/cc) consisting of a solid oriented polypropylene layer and a skin layer of polyethylene and a terpolymer comprising ethylene, propylene, and butylene. The skin layer was on the bottom and the polyproylene layer was laminated against the voided polyester.

The top and bottom sheets used in this example were coextruded and biaxially oriented. The top and bottom sheets were melt extrusion laminated to the voided polyester base using an metallocene catalyzed ethylene plastomer (SLP 9088) manufactured by Exxon Chemical Corp. The metallocene catalyzed ethylene plastomer had a density of 0.900 g/cc and a melt index of 14.0.

The L3 layer for the biaxially oriented top sheet was microvoided and further described in Table 2 where the refractive index and geometrical thickness is shown for measurements made along a single slice through the L3 layer; they do not imply continuous layers, a slice along another location would yield different but approximately the same thickness. The areas with a refractive index of 1.0 are voids that are filled with air, and the remaining layers are polypropylene.

TABLE 1

| Sublayer of L3 | Refractive Index | Thickness, μm |
|---|---|---|
| 1 | 1.49 | 2.54 |
| 2 | 1 | 1.527 |
| 3 | 1.49 | 2.79 |
| 4 | 1 | 1.016 |
| 5 | 1.49 | 1.778 |
| 6 | 1 | 1.016 |
| 7 | 1.49 | 2.286 |
| 8 | 1 | 1.016 |
| 9 | 1.49 | 2.032 |
| 10 | 1 | 0.762 |
| 11 | 1.49 | 2.032 |
| 12 | 1 | 1.016 |
| 13 | 1.49 | 1.778 |
| 14 | 1 | 1.016 |
| 15 | 1.49 | 2.286 |

The structure of the invention prior to application of the light sensitive silver halide layers was as follows:

Polyethylene with blue tints
Polypropylene with 0.14% optical brightener
Microvoided polypropylene
Polyethylene
Metallocene catalyzed ethylene plastomer
Voided polyester base with a void volume of 45% and 0.12% optical brightener
Metallocene catalyzed ethylene plastomer
Polypropylene
Polyethylene and a terpolymer of ethylene butylene and propylene The control used in this example is typical of prior art reflective color paper that utilize $TiO_2$ to improve whiteness and sharpness. The prior art material used in this example was Kodak Edge 7 Color Paper (Eastman Kodak Co.) which is a one side color silver halide coated support that utilizes cellulose paper as a base material.

Coating format 1 below was coated on a transparent photographic grade polyethylene terephthalate base to establish the native or inherent dye hue for coating format 1. The polyethylene terephthalate base was 110 micrometers thick and gelatin subbed on both sides of the base. The polyethylene terephthalate base had a stiffness of 30 millinewtons in the machine direction and 40 millinewtons in the cross direction. The % transmission of the polyester base material was 96%. Coating format 1 was also coated on the invention and the control support materials which consisted of typical polyethylene melt extruded coated cellulose paper base.

| | Coating Format 1 | Laydown $mg/m^2$ |
|---|---|---|
| Layer 1 | Blue Sensitive Layer | |
| | Gelatin | 1300 |
| | Blue sensitive silver | 200 |
| | Y-1 | 440 |

-continued

| | Coating Format 1 | Laydown mg/m$^2$ |
|---|---|---|
| | ST-1 | 440 |
| | S-1 | 190 |
| Layer 2 | Interlayer | |
| | Gelatin | 650 |
| | SC-1 | 55 |
| | S-1 | 160 |
| Layer 3 | Green Sensitive | |
| | Gelatin | 1100 |
| | Green sensitive silver | 70 |
| | M-1 | 270 |
| | S-1 | 75 |
| | S-2 | 32 |
| | ST-2 | 20 |
| | ST-3 | 165 |
| | ST-4 | 530 |
| Layer 4 | UV Interlayer | |
| | Gelatin | 635 |
| | UV-1 | 30 |
| | UV-2 | 160 |
| | SC-1 | 50 |
| | S-3 | 30 |
| | S-1 | 30 |
| Layer 5 | Red Sensitive Layer | |
| | Gelatin | 1200 |
| | Red sensitive silver | 170 |
| | C-1 | 365 |
| | S-1 | 360 |
| | UV-2 | 235 |
| | S-4 | 30 |
| | SC-1 | 3 |
| Layer 6 | UV Overcoat | |
| | Gelatin | 440 |
| | UV-1 | 20 |
| | UV-2 | 110 |
| | SC-1 | 30 |
| | S-3 | 20 |
| | S-1 | 20 |
| Layer 7 | SOC | |
| | Gelatin | 490 |
| | SC-1 | 17 |
| | $SiO_2$ | 200 |
| | Surfactant | 2 |

Y-1

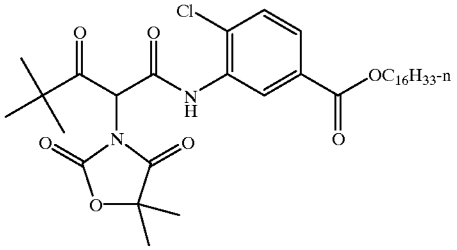

ST-1=N-tert-butylacrylamide/n-butyl acrylate copolymer (50:50)

SC-1

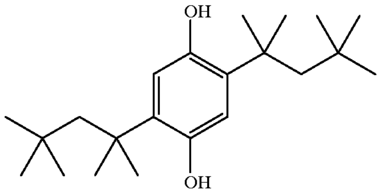

M-1

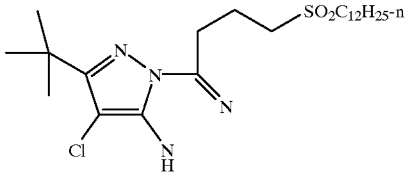

S-2 = diundecyl phthalate

ST-2

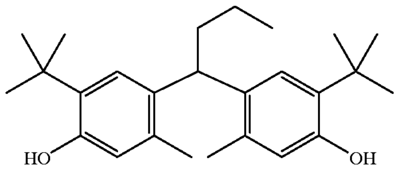

ST-3

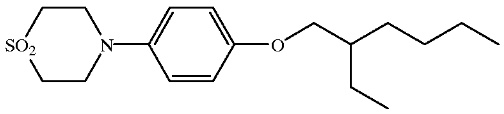

ST-4

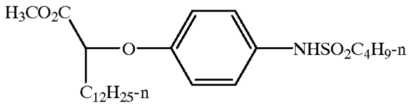

UV-1

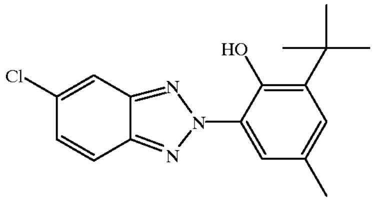

UV-2

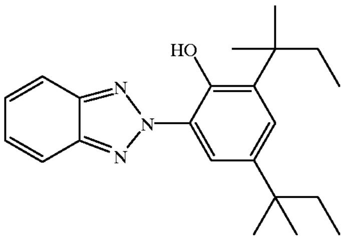

S-3 = 1,4-Cyclohexyldimethylene bis(2-ethylhexanoate)

C-1

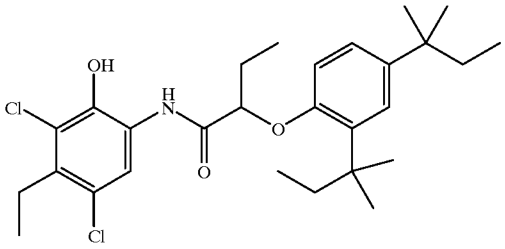

-continued

Dye 1

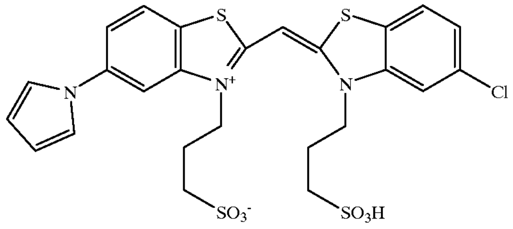

The reflective imaging materials of this example were printed with test images using a three color (red, green, and blue) laser sensitometer. The photographic support was measured for spectral transmission using an X-Rite Model 310 photographic densitometer. The display materials were also measured for L* and b* using a Hunter spectrophotometer, CIE system, using procedure D6500. The surface roughness average was measured with surface roughness gauge with a spatial frequency between 0.3 and 6.35 mm. The data for invention and the control are listed in Table 2 below.

TABLE 2

| Measure | Invention | Prior Art Reflective Photographic Paper | Imaging Layers Coated on Transparent Support |
|---|---|---|---|
| L* | 95.5 | 93.6 | NA |
| Cyan hue angle | 203 | 196 | 210 |
| Magenta hue angle | 330 | 337 | 329 |
| Yellow hue angle | 102 | 96 | 98 |
| b* | −3.42 | -3.61 | NA |
| % Transmission | 1.20% | 4.80% | NA |
| Roughness Average | 0.04 | O.61 | NA |

The invention support material coated with the light sensitive silver halide coating format of this example exhibits all the properties needed for an photographic reflective image. Further the photographic material of this invention has many advantages over the prior art photographic paper which is typical of prior photographic paper with incorporated $TiO_2$ as a technique to improve whiteness. The voided and non-voided layers of the invention have levels of optical brightener and colorants adjusted to provide optimum optical properties for control of L* opacity. Because the native yellowness of coating format 1 was offset by the blue tinting in L1 in the invention, the density minimum areas for the invention had a slight blue tint. The L* for the invention was a superior 95.5 compared to an L* of 93.6 for the control material.

The hue angle of the yellow, magenta, and cyan dye set of coating format 1 was changed less with the invention which contained no white pigments compared to the control sample which had incorporated $TiO_2$ in the polyethylene layers to improve whiteness. The dye hue angle for the coating format 1 yellow dye coated on a transparent support was 98 degrees. The same yellow dye coated on the prior art material produced a yellow dye hue angle of 96 degrees, which translates into a red yellow. The yellow dye set in coating format 1, when coated on the translucent base of the invention, yielded a perceptually preferred yellow dye hue angle of 102 degrees, which translates into a green yellow. The green yellow, being perceptually preferred, produces a higher quality image with more snap than the control and a yellow green. The data above also show that the magenta dye hue angle changed only 1 degree with the invention compared to 8 degrees with the prior art photographic paper. Similarly, the cyan dye hue angle changes only 3 degrees with the invention material while it changes 14 degrees with the prior art transmission material.

In summary, the support material of the invention was able to maintain the dye hue angle of coating format 1 within +/−4 degrees maintaining the inherent snappy dye hue of the color couplers used in coating format 1. The invention material did a much better job maintaining the dye hue of coating format 1 leading to a perceptually preferred image compared to the prior art photographic reflective papers which utilize $TiO_2$ in the support material. Further, because the support of the invention utilizes a voided polyester base material laminated with biaxially oriented polyolefin sheets, the image is tear proof and durable. Because the support material utilizes a microvoided polyester support material, the % transmission of the invention is significantly improved compared to the control material reducing undesirable backside illumination. Finally, since the base material used in the invention is smooth compared to prior art photographic paper which uses rough cellulose paper as a base, the gloss of the invention is significantly improved, creating a high gloss image.

The invention has been described in detail with particular reference to certain preferred embodiments thereof, but it will be understood that variations and modifications can be effected within the spirit and scope of the invention.

What is claimed is:

1. A photographic element comprising a laminated base wherein said base comprises a voided polyester sheet having laminated thereto a biaxially oriented polyolefin sheet on the bottom of said polyester sheet and a biaxially oriented polyolefin sheet laminated to the top of said polyester sheet wherein said element has a stiffness in any direction of between 150 and 300 millinewtons, said polyester sheet has a glass transition temperature between about 50° C. and 150° C., said top biaxially oriented sheet comprises at least one layer that is voided, and said polyester sheet has a void volume of between 30% and 60%, and wherein said top biaxially oriented polyolefin sheet is substantially free of white pigment.

2. The photographic element of claim 1 wherein after imaging and development the contribution to dye hue of said laminated base is less than 7%.

3. The photographic element of claim 2 wherein said element maintains a dye hue angle within +/−4 degrees.

4. The photographic element of claim 1 wherein at least one layer above said voided layer of said top polyolefin sheet comprises optical brightener.

5. The photographic element of claim 1 wherein at least one layer above said voided layer of said polyolefin sheet comprises hindered amine light stabilizer.

6. The photographic element of claim 2 wherein at least one layer above said at least one voided layer comprises bluing tints.

7. The photographic element of claim 1 wherein the topmost layer of said top biaxially oriented polyolefin sheet comprises polyethylene.

8. The photographic element of claim 2 wherein said polyester sheet has at least one nonvoided skin layer.

9. The photographic element of claim 8 wherein said at least one nonvoided skin layer comprises polyethylene or polyester.

10. The photographic element of claim 9 wherein said at least one nonvoided skin layer of said polyester sheet comprises at least one member selected from the group consisting of white pigments, bluing tints, and optical brighteners.

11. The photographic element of claim 1 wherein said base has a percent light transmission of between 5 and 0%.

12. The photographic element of claim 1 wherein said polyester sheet has a void initiating material comprising polystyrene or polymethyl methacrylate.

13. The photographic element of claim 1 wherein said voided polyester sheet comprises at least one polyolefin layer between said voided layer and the binder for the bottom biaxially oriented polyolefin sheet.

14. The photographic element of claim 1 wherein said bottom biaxially oriented polyolefin sheet provides a the bottom surface roughness of between 0.3 and 2.0 μm.

15. The photographic element of claim 1 wherein said element is provided with an antistatic layer that has a surface resistivity of less than $10^{13}$ ohm/square.

16. The photographic element of claim 1 wherein the upper surface of the bottom biaxially oriented polyolefin sheet is provided with indicia.

17. The photographic element of claim 1 wherein said top biaxially oriented polyolefin sheet has an upper surface roughness of between 0.2 and 1.2 μm.

18. The photographic element of claim 1 wherein said top biaxially oriented polyolefin sheet has an upper surface roughness of between 0.01 and 0.18 μm.

19. The photographic element of claim 1 wherein said element is substantially free of white pigment.

* * * * *